United States Patent [19]

Kawamoto

[11] 4,096,693
[45] Jun. 27, 1978

[54] TORQUE CONVERTER FLUID CONTROL SYSTEM FOR POWER TRANSMISSION SYSTEM

[75] Inventor: Tamio Kawamoto, Sagamihara, Japan

[73] Assignee: Nissan Motor Company, Limited, Yokohama, Japan

[21] Appl. No.: 786,827

[22] Filed: Apr. 12, 1977

[30] Foreign Application Priority Data

Apr. 12, 1976 Japan ............... 51-44425[U]

[51] Int. Cl.² ............................................. F16D 33/00
[52] U.S. Cl. ......................................... 60/337; 60/339
[58] Field of Search .................... 60/339, 364, 337

[56] References Cited

U.S. PATENT DOCUMENTS

| 2,603,238 | 7/1952 | Trail | 138/26 |
| 2,701,948 | 2/1955 | Iavelli et al. | 60/339 |
| 2,737,423 | 3/1956 | Zeidler | 60/339 X |
| 3,204,412 | 9/1965 | Zeidler | 60/361 |
| 3,537,263 | 11/1970 | Briski | 60/337 |

FOREIGN PATENT DOCUMENTS

| 719,480 | 4/1942 | Germany. |
| 907,252 | 3/1954 | Germany. |
| 1,134,257 | 2/1963 | Germany. |
| 1,400,427 | 5/1970 | Germany. |
| 2,505,640 | 9/1975 | Germany. |
| 412,499 | 11/1966 | Switzerland. |

Primary Examiner—Edgar W. Geoghegan
Attorney, Agent, or Firm—Bacon & Thomas

[57] ABSTRACT

In a power transmission system, a bearing is provided for carrying an output shaft of the torque converter unit. The bearing is lubricated by torque converter fluid delivered thereto through a lubrication circuit. The lubrication circuit includes a flow restriction ring and a drain passage of a relatively large size whereby the life of a fluid seal arranged in the lubrication circuit is remarkably prolonged.

4 Claims, 2 Drawing Figures

TORQUE CONVERTER FLUID CONTROL SYSTEM FOR POWER TRANSMISSION SYSTEM

BACKGROUND OF THE INVENTION

The present invention relates generally to a power transmission system equipped with a torque converter unit and a torque converter fluid control system for producing circulation of pressurized fluid under control between the torque converter unit and a fluid source, and more particularly to a torque converter fluid control system which includes a lubrication circuit for applying torque converter fluid to a bearing which carries the driven shaft of the torque converter unit.

One conventional type of a power transmission system includes elements such as a torque converter unit, a hydraulic pump and a clutch which may be of the type having a flywheel, which are arranged in line with one behind another for cooperation therebetween. When such transmission system is combined with a vehicle gear box in a vehicle drive line, the axial length thereof should be minimized since the front floor pan of the vehicle must be raised to make room for the transmission system. Consequently, the aforementioned elements of the power transmission system are arranged axially quite close to each other.

In the conventional power transmission system of the above mentioned type, a bearing is provided for carrying a driven shaft one end portion of which is drivably connected to the turbine of the torque conveter unit and the other end portion of which is fixedly secured to the flywheel of the clutch, and further provided is a lubrication circuit for utilizing torque converter fluid as a lubricant for the bearing.

This lubrication circuit comprises an extension annular passage, formed about the driven shaft, through which torque converter fluid is drawn to the bearing, a fluid seal for providing a sealingly closed end with the extension annular passage on the clutch side of the bearing, and a lubrication fluid drain passage having one end opening to the extension annular passage at a location between the bearing and the fluid seal and the other end fluidly communicating with a sump. The torque converter fluid applied to the bearing is returned to the sump through this lubrication fluid drain passage.

In this instance, for the reasons mentioned above, the axial space between the bearing and the fluid seal is quite narrow. Accordingly, the cross sectional area of the lubrication passage is compelled to be small.

Therefore, the pressure acting on the fluid seal increases in proportion to the increases of the pressure produced within the torque converter unit since the extension annular passage cannot be drained off enough through such small lubrication fluid drain passage particularly when the torque converter unit is under high speed rotation conditions. Under such conditions of the torque converter unit, the pressure acting on the fluid seal may increase high above the allowable pressure of same.

Therefore, the life of the fluid seal disposed in such conventional lubrication circuit is shortened considerably, and a critical case may take place in which the fluid seal leaks and elements of the clutch such as clutch linings are drenched with leaked fluid. Since such drenched clutch linings cannot transmit driving torque satisfactorily because of slippage occurring in the engagement therebetween, the torque transmission efficiency of the power transmission system is impaired by a great deal.

It is accordingly an object of the present invention to provide a power transmission system having an improved torque converter fluid control system which is free from the foregoing drawbacks existing in the conventional power transmission system of the foregoing type.

It is another object of the present invention to provide a power transmission system having a torque converter fluid control system which can optimally control the pressure and flow rate of torque converter fluid circulating therein.

BRIEF DESCRIPTION OF THE DRAWING

These and other objects and advantages of the present invention will become more apparent from the following description taken in conjunction with the accompanying drawings, in which.

DESCRIPTION OF THE PREFERRED EMBODIMENT

Figure 1:
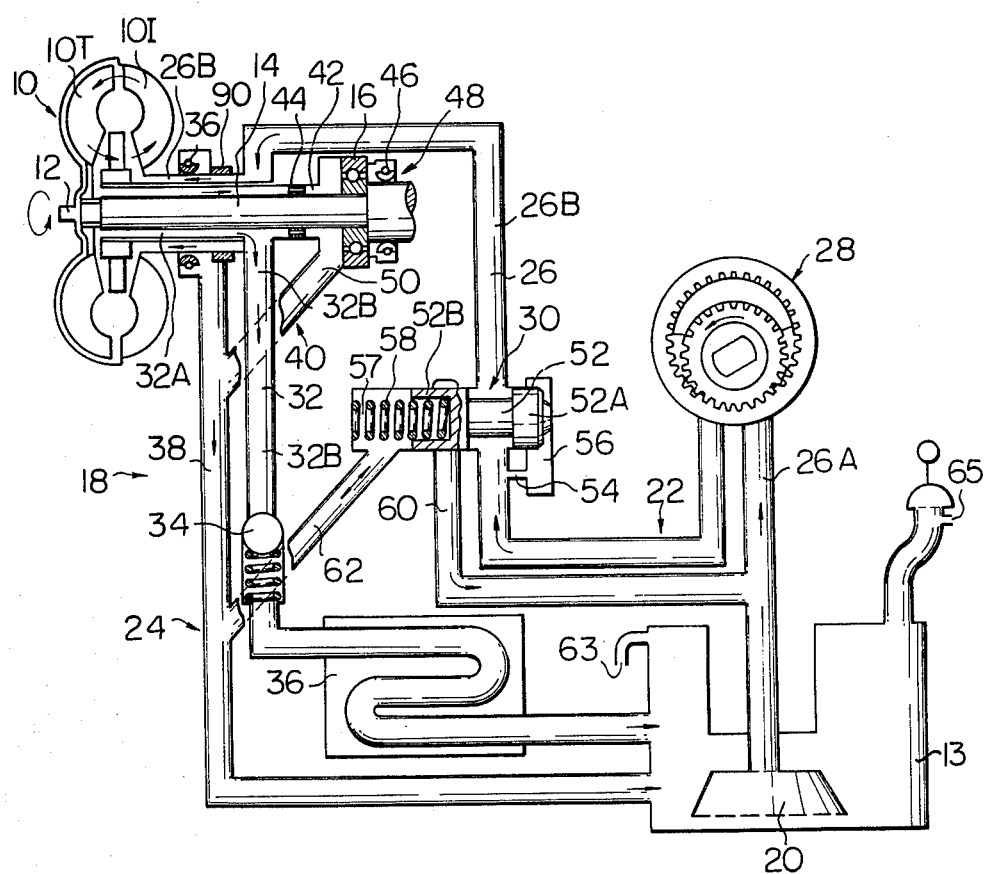
FIG. 1 is a diagrammatic view of a portion of a power transmission system with which the present invention is mainly concerned and an enlarged torque converter fluid control system according to the present invention showing the circulation of torque converter fluid therein.

In the drawings, like characters represent like or corresponding components.

Referring to FIG. 1, a power transmission system comprises a torque converter unit 10 of the conventional type and a torque converter input shaft or a driving shaft 12 connected to the impeller 10I of the torque converter unit 10. When the power transmission is mounted on an engine powered vehicle, the driving shaft 12 is connected to the crankshaft of the engine (not shown). A torque converter output shaft or a driven shaft 14 is connected at one end portion thereof to the turbine 10T of the torque converter unit 10 and at the other end carried by a bearing 16. A torque converter fluid control system 18 is provided with the power transmission system for producing circulation of pressurized torque converter fluid under control between the torque convert 10 and a fluid source or a sump 13. The torque converter fluid control system 18 comprises a fluid supply circuit 22 and a fluid return circuit 24 each connecting the fluid source 13 to the torque converter unit 10. The fluid supply circuit 22 includes a fluid supply passage 26 composed of a suction passage portion 26A and a discharge passage portion 26B which are fluidly connected to the corresponding portions of a hydraulic pump or a gear pump 28 as shown. A pressure regulator 30 is provided in the discharge passage portion 26B as a passage portion thereof for regulating the flow rate of torque converter fluid passed therethrough, which will be explained hereinafter in detail.

The fluid return circuit 24 includes a fluid return passage 32 composed of an annular passage portion 32A formed about the driven shaft and a passage portion 32B having one end fluidly connected to the annular passage portion 32A and the other end fluidly connected to the fluid source 13. In the passage portion 32B, a relief valve 34 is provided for maintaining the torque converter fluid pressure discharged from the torque converter unit 10 above a predetermined value and downstream of this relief valve 34 a cooler 36 is provided for maintaining the temperature of torque converter fluid passed therethrough below a predetermined value. A leaked fluid drain passage 38 is further provided in the fluid return passage 24 for draining the leaked fluid from the hydraulic pump 28. The leaked fluid drain passage 38 has one end fluidly communicating with a fluid seal 36 disposed at the leak portion or the pump body bushing of the hydraulic pump 28 and the other end fluidly connected to the fluid source 13.

For lubrication of the bearing 16, the torque converter fluid control system 18 is further provided with a lubrication circuit 40 which comprises an extension annular passage 42. The extension annular passage 42 is formed about the driven shaft 14 and fluidly connected to the annular passage portion 32A. A flow restriction ring 44 is mounted on the driven shaft 14 and fluidly connected to the extension annular passage as a passage portion thereof. The flow restriction ring 44 is situated upstream of the bearing 16 with respect to the flow of torque converter fluid passing through the extension annular passage 42 and functions to reduce the flow rate of torque converter fluid passed therethrough and delivered into the bearing 16. A fluid seal 46 is also mounted on the driven shaft by the side and downstream of the bearing 16 for providing with the extension annular passage 42 a closed end 48. For draining this extension annular passage, a lubrication fluid drain passage 50 is provided which has one end fluidly connected to the extension annular passage 42 at a location between the flow restriction ring 44 and the bearing 16 and the other end fluidly connected to the leaked fluid drain passage 38.

In this instance, according to the present invention the fluid restriction ring 44 is constructed to restrict the flow rate of fluid applied to the bearing 16 with respect to the drainability of the lubrication fluid drain passage 50 so that the pressure of lubrication fluid applied to the bearing may be maintained below a predetermined value which is permissible to the fluid seal.

With reference to flow of torque converter fluid, the torque converter fluid control system 18 will be further explained in detail. When the hydraulic pump 28 starts operating driven by the driven shaft 14, torque converter fluid in the fluid source 13 is drawn therefrom to the hydraulic pump 28 through the fluid screen 20 and the suction passage portion 26A. The torque converter fluid drawn to the hydraulic pump is then discharged therefrom to the discharge passage portion 26B and subject to regulation by the pressure regulator 30. The pressure regulator 30 is composed of a valve spool 52, an orifice or a flow restriction 54, a pressure accumulating chamber 56 and a spring 58. This pressure regulator 30 functions to maintain the pressure and therefore the flow rate of torque converter fluid passed therethrough at a substantially constant predetermined level independent of variations in rotating speed of the hydraulic pump 28. Regulation by this pressure regulator 30 is performed as follows: When the rotating speed of the hydraulic pump 28 becomes higher, more torque converter fluid is discharged from the hydraulic pump into the discharge passage portion 26B. Thus, increase of pressure occurs in the torque converter fluid being delivered to the discharge passage portion 26B. Such increase of pressure is introduced into the pressure accumulating chamber 56 through the flow restriction 54 and causes the pressure of fluid in the pressure accumulating chamber to rise to a corresponding level. When the pressure of fluid in the pressure accumulating chamber 56 becomes higher than a predetermined level, the valve spool 52 is actuated to move lengthwise to the left against the force of the coiled spring 58. By this endwise displacement of the valve spool 52, the discharge passage portion 26B is partly closed by a land 52A to restrict the flow rate of torque converter fluid passed through the pressure regulator 30, and a by-pass passage 60 is opened by a land 52B to communicate with the suction passage portion 26A to deliver a surplus amount of torque converter fluid resulting from above restriction back into the suction passage portion. When the pressure of fluid in the pressure accumulating chamber 56 and therefore in the discharge passage portion is below a predetermined level, the valve spool 52 is biased by the coiled spring 58 to take such position as illustrated in the drawing at which the land 52B blocks communication between the bypass passage 60 and the suction passage portion 26A and the land 52A fully opens the discharge passage portion 26B.

Torque converter fluid discharged from the hydraulic pump 28 is subject to regulation by the pressure regulator in a manner as explained above, and is then supplied to the torque converter unit 10 flowing through the discharge passage portion 26B as shown by arrows in the drawing. After the known operation of multiplication of transmitting torque within the torque converter unit 10, torque converter fluid is delivered therefrom into the annular passage portion 32A and then returned to the fluid source 13 through the passage portion 32B while subjected to regulation by the relief valve 34 which functions to maintain the pressure of torque converter fluid within the torque converter unit 10 above a desirable high level and by the cooler 36 which serves to maintain the temperature of torque converter fluid below a predetermined value. Leaked fluid from the hydraulic pump 28 is led to a portion at which the fluid seal 36 is situated and from which portion it is retunred to the fluid source 13 through the leaked fluid drain passage 38.

A portion of torque converter fluid discharged from the torque converter unit 10 is supplied to the bearing 16 and the fluid seal 46 for lubrication thereof through the flow restriction ring 44 which reduces the flow rate of fluid passed therethrough. The torque converter fluid supplied to the bearing and the fluid seal is then drained into the leaked fluid drain passage 38 through the lubrication fluid drain passage 50 and is returned to the fluid source 13.

Designated by the reference numeral 62 is a passage provided for draining a chamber 57 defined at a spring loaded end of the spool valve 52 so that the fluid oozed from the periphery of the land 52B may be drained into the leaked fluid drain passage 38 and may not produce any undesirable influence to displacement action of the spool valve 52.

Designated by the reference numerals 63 and 65 are air-breathers arranged on the top portion of the fluid sump 13 and at the fluid filler pipe of same respectively.

Figure 2:
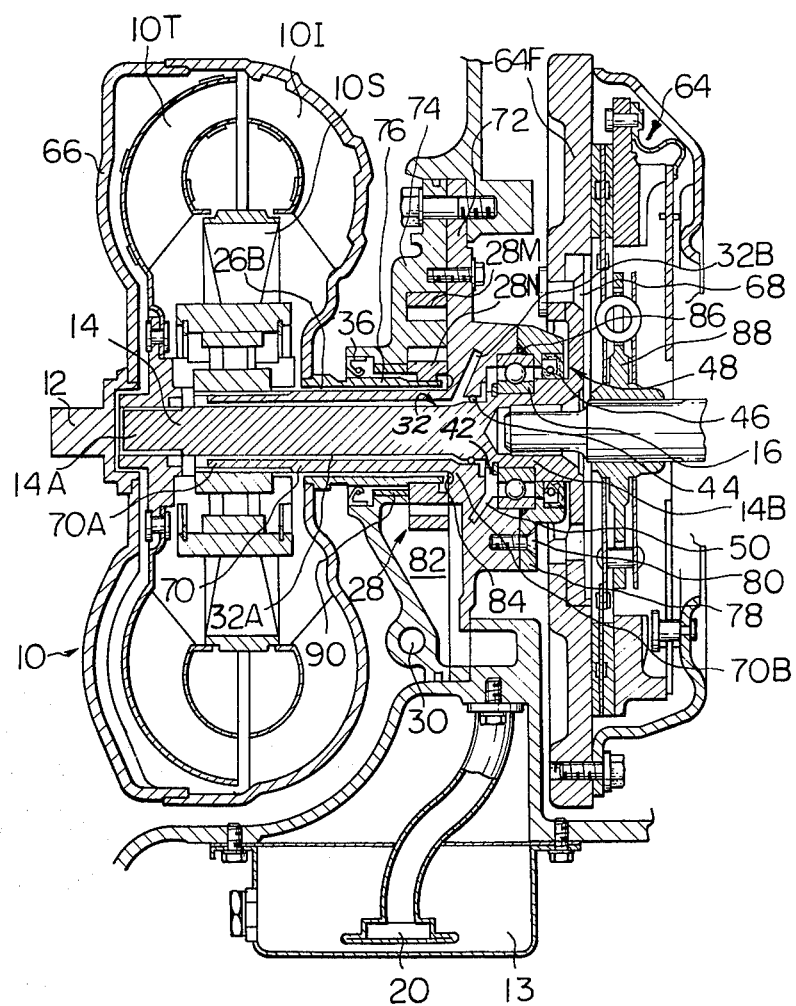
FIG. 2 is a sectional view of a power transmission system which embodies the torque converter fluid control system of the present invention.

Referring to FIG. 2, the torque converter fluid control system 18 will be explained further in detail.

An illustrated power transmission system, to which the present invention is optimally applied, comprises the torque converter unit 10, the hydraulic pump 28 and a clutch 64 having a flywheel 64F, which are arranged in line with one behind another as shown. The torque converter unit 10 is of the usual type and is composed of stator 10S, turbine 10T and impeller 10I. The driving shaft 12 is integral with impeller shell part 66. The turbine 10T is splined to the driven shaft 14 at one end 14A thereof and at the other end 14B thereof the flywheel 64F of the clutch 64 is fixedly secured by means of suitable fastening means such as rivets 68. The stator 10S is splined to a stationary sleeve shaft 70 at one axial end 70A thereof and at the other axial end portion 70B it is integrally formed with a radially extending flange portion 72. The flange portion 72 serves as one of the mating members 72 and 74 between which the hydraulic pump 28 is received. A rotatable sleeve shaft 76 is integrally connected at one end thereof to the impeller shell part 66 while being splined at the other end thereof to an inner gear 28N of the hydraulic pump 28.

The driven shaft 14 is carried at one end thereof, which is on the side close to the clutch 64, by means of the bearing 16 upon the member 72. A retainer 78 is provided for securing the bearing 16 to the member 72 and is securely fixed to the member 72 by means of suitable fastening means such as screws 80. An annular passage portion 32A of a return fluid passage 32 is formed about the driven shaft 14 to which the extension annular passage 42 is fluidly connected in order to establish communication between the torque converter unit 10 and the bearing 16. The fluid flow restriction ring 44 is mounted on the driven shaft 14 on the torque converter unit side of the bearing 36 or upstream of the bearing with respect to the flow of fluid in the extension annular passage 42 in such a manner that the flow restriction ring 44 may restrict the flow rate of torque converter fluid passed therethrough to be delivered to the bearing. On the clutch side of the bearing 16 or downstream of same, the fluid seal 46 is mounted on the driven shaft 14 to provide the closed end 48 with the extension annular passage 42. The annular passage portion 32A is drained through the passage portion 32B. For drain of the extension annular passage 42, the lubrication fluid drain passage 50 with a novel arrangement according to the present invention is provided which has one end opening to the extension annular passage 42 at a location between the flow restriction ring 44 and the bearing 16 and the other end fluidly communicating with the fluid source 13 through the leaked fluid drain passage 38 (not shown in FIG. 2). In this instance, the lubrication fluid drain passage 50 is constructed of a relatively large cross-sectional size since the novel arrangement thereof provides a relatively wider space as seen from the drawing. By this increased size of the lubrication fluid drain passage, the fluid flow restriction ring 44 can be constructed to allow a relatively large flow rate of fluid to pass therethrough whereby the bearing 16 is kept lubricated by fresh lubrication fluid.

Compared to this novel arrangement according to the present invention, the conventional drain passage is arranged to open to the extension annular passage at a location between the bearing and the fluid seal. Thus, the conventional drain passage has a passage portion crossing the mating surfaces of the members 72 and 78. Accordingly, the conventional drain passage arrangement is necessarily sealed at the above-mentioned passage portion by provision of sealing arrangements and accurate finish machining of the mating surfaces.

The lubrication fluid return passage according to the present invention is therefore superior to the conventional one both in draining performance and in cost.

In operation of the power transmission system, driving force is applied to the impeller shell part 66 from the driving shaft 12 which part causes the sleeve shaft 76 to rotate. By rotation of this sleeve shaft 76, the inner gear 28N of the hydraulic pump 28 is caused to rotate and in turn causes the outer gear 28M to rotate therearound whereby torque converter fluid in the fluid source 13 is drawn to a portion 82 adjacent to the suction port of the hydraulic pump 28 through the fluid screen 20 at the bottom of the fluid source 13. The fluid drawn to the portion 82 then flows into the space defined between the inner gear 28N and the outer gear 28M and is forcedly discharged therefrom into the discharge passage portion 26B through the discharge port 84 of the hydraulic pump 28. The pressure of torque converter fluid thus discharged is subject to regulation by the pressure regulator 30 and is maintained at a predetermined desirable value before being supplied to the torque converter unit 10 through the discharge passage portion 26B defined between the rotatable sleeve shaft 76 and the stationary sleeve shaft 70. After the known flow within the torque converter unit 10 for multiplication of transmitting torque, torque converter fluid is discharged therefrom into a fluid return passage 32 defined between the driven shaft 14 and the stationary sleeve shaft 70. Almost the whole quantity of torque converter fluid discharged from the torque converter unit 10 is then returned to the fluid source 13 through the fluid return passage 32, which is arranged with the ball check relief valve 34 and the cooler 36 as shown in FIG. 1. However, a small portion of fluid discharged from the torque converter unit passes through the flow restriction ring 44 and flows into the sections at which the bearing 16 and the fluid seal 46 are situated. The bearing 16 and the fluid seal 46 are therefore lubricated by said small portion of torque converter fluid which is then returned to the fluid source 13 through the lubrication fluid drain passage 50 and further through the return fluid passage 32 as shown in FIG. 1.

In this instance, as mentioned with respect to FIG. 1 the flow restriction ring 44 is constructed to restrict the flow rate of fluid delivered to the bearing 16 with respect to the size of the lubrication fluid drain passage 50 so that the pressure of lubrication fluid applied to the bearing may be maintained below a predetermined value which is quite effective to elongate the life of the fluid seal 46.

Designated by the reference numeral 86 is an O-ring seal situated on the periphery of the bearing 16, by 88 is a clutch plate hub for transmitting the driving force of the flywheel 64F to a gear box (not shown) and by 90 is a pump body bushing for carrying the rotatable sleeve shaft 76. Torque converter fluid leaked from the hydraulic pump 28 is applied to the fluid seal 36 after lubricating the bushing 90.

From the foregoing description, it will be understood that the torque converter fluid control system according to the present invention includes the lubrication circuit which is adapted to provide lubrication fluid with a relatively low pressure whereby the fluid seal arranged in the lubrication circuit obtains a remarkably prolonged life.

It will be further appreciated that the torque converter fluid control system according to the present invention includes the lubrication fluid drain passage 50 which is arranged at the relatively spacious section between the flow restriction ring 44 and the bearing 16 whereby the lubrication fluid drain passage can be constructed of a relatively large size which provides improved life to the fluid seal without degrading lubrication performance of the torque converter fluid control system.

It will be still further appreciated that the lubrication fluid drain passage 50 according to the present invention is arranged to extend in a single member 72, as compared to the conventional drain passage arranged to extend in two-piece members such as members 72 and 78 shown in FIG. 2, which is quite reliable in draining operation and also economical to manufacture.

What is claimed is:

1. In a power transmission system having a torque converter unit, a driving shaft drivably connected to the impeller of said torque converter unit, a driven shaft drivably connected at one end thereof to the turbine of said torque converter unit, and a bearing mounted on said driven shaft at a location axially spaced apart from said one end, a torque converter fluid control system, comprising:
a fluid source;
a fluid supply circuit and a fluid return circuit each interconnecting said fluid source and said torque converter unit, said fluid return circuit including a fluid return passage having an annular passage portion formed about said driven shaft; and
a lubrication circuit for said bearing, including an extension annular passage formed about said driven shaft and fluidly connected to said annular passage portion, a flow restriction ring mounted on said driven shaft and fluidly connected to said extension annular passage as a passage portion thereof, said flow restriction ring being situated upstream of said bearing for reducing the flow rate of fluid passed therethrough, a fluid seal mounted on said driven shaft downstream of said bearing for providing with said extension annular passage a closed end, and a lubrication fluid drain passage having one end fluidly connected to said extension annular passage at a location between said flow restriction ring and said bearing and the other end fluidly connected to said fluid source.

2. A torque converter fluid control system as set forth in claim 1, in which said fluid return circuit further comprises a relief valve disposed in said fluid return passage for maintaining the pressure of fluid discharged from said torque converter unit above a predetermined level, and a cooler disposed in said fluid return passage downstream of said relief valve for maintaining the temperature of said fluid below a predetermined level.

3. A torque converter fluid control system as set forth in claim 1, in which said fluid supply circuit comprises a fluid supply passage composed of a discharge passage portion and a suction passage portion each fluidly connected to a hydraulic pump, a pressure regulator operative to close said discharge passage portion in response to the condition in which the pressure of fluid in said discharge passage portion is above a predetermined level, and a by-pass passage fluidly interconnecting said pressure regulator and said fluid source for delivering a portion of said fluid back into said suction passage portion.

4. In a power transmission system having a torque converter unit, a clutch having a flywheel, a driving shaft drivably connected to the impeller of said torque converter unit, a driven shaft having one end drivably connected to the turbine of said torque converter unit and the other end fixed to said flywheel, a hydraulic pump disposed about said driven shaft and located between said torque converter unit and said clutch, and a bearing mounted near said other end portion of said driven shaft, a torque converter fluid control system, comprising:
a fluid source;
a fluid supply circuit and a fluid return circuit each interconnecting said fluid source and said torque converter unit, said fluid return circuit including a fluid return passage having an annular passage portion formed about said driven shaft and a leaked fluid drain passage for draining therethrough the leaked fluid from said hydraulic pump; and
a lubrication circuit for said bearing, including an extension annular passage formed about said driven shaft and fluidly connected to said annular passage portion, a flow restriction ring mounted on said driven shaft and fluidly connected to said extension annular passage as a passage portion thereof, said flow restriction ring being situated on the torque converter side of said bearing for reducing the flow rate of fluid passed therethrough into said bearing, a fluid seal mounted on said driven shaft on the clutch side of said bearing for providing with said extension annular passage a sealingly closed end, and a lubrication fluid drain passage having one end fluidly connected to said extension annular passage at a location between said flow restriction ring and said bearing and the other end fluidly connected to said leaked fluid drain passage.

* * * * *